M. V. SMITH.
PRESSURE REGULATOR.
APPLICATION FILED FEB. 18, 1911.

1,021,383.

Patented Mar. 26, 1912.
4 SHEETS—SHEET 1.

Fig. 1.

Witnesses:

Inventor:
M. V. Smith
By his Attorneys,
Sutherland & Anderson

M. V. SMITH.
PRESSURE REGULATOR.
APPLICATION FILED FEB. 18, 1911.

1,021,383.

Patented Mar. 26, 1912.
4 SHEETS—SHEET 2.

M. V. SMITH.
PRESSURE REGULATOR.
APPLICATION FILED FEB. 18, 1911.

1,021,383.

Patented Mar. 26, 1912.
4 SHEETS—SHEET 3.

Witnesses:

Inventor:
M. V. Smith
By his Attorneys,
Sutherland & Anderson

UNITED STATES PATENT OFFICE.

MARTIN V. SMITH, OF HARTFORD, CONNECTICUT, ASSIGNOR OF ONE-HALF TO JOHN J. DELAHANTY, OF HARTFORD, CONNECTICUT.

PRESSURE-REGULATOR.

1,021,383.  Specification of Letters Patent. Patented Mar. 26, 1912.

Application filed February 18, 1911. Serial No. 609,448.

*To all whom it may concern:*

Be it known that I, MARTIN VALENTINE SMITH, a citizen of the United States, residing at Hartford, in the county of Hartford and State of Connecticut, have invented certain new and useful Improvements in Pressure-Regulators, of which the following is a specification.

This invention relates to pressure regulators.

A pressure regulator comprising my invention can be used with advantage in widely different connections, for instance it may be employed in conjunction with pneumatic, steam, electric and other systems.

The device comprises in its make-up broadly a controller and said controller may be utilized for a variety of purposes; for example it may be utilized as an electric switch or as a clutch or belt shifter.

It is the primary object of the invention to effect automatically the movement of this controller without the necessity of spring means for the purpose, and as a matter of preference this result is effected by fluid.

In the present case the regulator is organized for use in connection with a pneumatic system, such as is generally found on an electric or steam car for operating the brake or brakes thereof. As is well known a pneumatic brake system involves an air tank and a pump for supplying said tank with the necessary compressed air to set the brake or brakes, a motor, generally of the electric type, being provided to operate the pump or equivalent compressing device.

In the drawings accompanying and forming part of the present specification I have illustrated in detail one convenient form of embodiment of the apparatus which to enable those skilled in the art to practice the invention will be set forth fully in the following description while the novelty of the invention will be included in the claims succeeding said description. From this it will be evident that I do not restrict myself to said showing; I may depart materially therefrom within the scope of my said claims. In the showing thus made, however, the pressure regulator operates in connection with a compressed air tank and an electric circuit although, as will be clear from the observations I have already made, this is not essential. In said drawings the controller to which brief allusion has already been made, takes the form of a switch for controlling said circuit, the construction being such that when the pressure in the tank is high or at the necessary operating standard the switch will be maintained in a position to break the circuit, while when the pressure goes below a certain point the switch will be operated to close the circuit, start the pump and thereby bring the pressure in the tank up to the requisite point. Preferably, although not necessarily, this switch is operated in opposite directions by or through the agency of the compressed air or equivalent fluid and the switch is also preferably positively held in its two positions by latching or analogous means also governed by the compressed air or other fluid.

Referring to said drawings.

Like characters refer to like parts throughout the several figures.

The different parts of the device are carried in practice by a suitable support and for this purpose the plate 2 may be provided, and although this plate is shown circular, this is not a matter of consequence. As already intimated the device includes a controller, the character of which will vary with the particular use to which the apparatus is applied. It is shown consisting of an electric switch denoted in a general way by 3, the body of which is denoted by 4, being represented as made in the form of a loop for a reason that will hereinafter appear. Extending from one side of the loop-like body 4 and fastened suitably thereto, is a plate 5 insulated from the body 4 and provided with the clips 7 of practically duplicate construction coöperative with contacts 8 fastened to and insulated from the support or plate 2. It will be understood that when the contacts or clips 7 extend over the fingers or contacts 8, the circuit will be closed, the plate 5 with its two contacts or clips serving to bridge the normally open break in the circuit and presented by the separated contacts 8. The circuit is assumed to be open in Fig. 1, the contacts 7 at this time being remote from the fingers 8. The different parts may as a matter of protection be inclosed or incased by the housing 9 into which the support or plate 2 is fitted, the two parts being connected preferably in some rigid manner. If desired and as shown the casing 9 may be provided with a glass top 10, and it may also carry the binding posts or studs 11 insulated from said casing and connected by wires as 12 with the contacts or fingers 8.

The organization of the apparatus is such that when the electric circuit partly described, is closed, a motor for operating an air pump is started, the air pump on its action supplying compressed air to a storage tank, and when said circuit is broken, the motor is stopped as is the pump so as to cut off the supply of compressed air to said tank.

The body 4 approximately opposite the plate or arm 5 is provided with a second arm or projection 13 which may as shown be equipped with a hub or sleeve 14 supported for rocking motion by the pivot or pin 15 which may as represented consist of a screw tapped into the plate 2. From this it will be evident that the switch 3 has an oscillatory or swinging movement, it being shown in one of its two extreme positions in Fig. 1 or that which it occupies when the electric circuit is broken. I might state at this point that I prefer to positively hold the switch in its two shifted positions and to also oppositely throw said switch. These points, however, are not absolutely necessary.

As I have hereinbefore stated the regulator is shown constructed for coöperation with a compressed air system and in this event the motor stopping and starting device as the switch 3 is held in its two extreme positions by suitable positive means which, of course, may vary greatly in type. The organization, however, is such that when the pressure of air reaches a certain point the switch is released, thereafter automatically shifted, and then held in its shifted position, while when a second degree of pressure is subsequently reached, the switch is again automatically released, shifted to its first position and there held until the pressure reaches the first point when the first operation is repeated. This is a general statement of my intent, it being apparent that the described order of operations may be reversed. Hereinafter I shall describe in detail how the apparatus operates in connection with an air brake.

The support 2 is shown having the chamber 16 formed therein, said chamber inclosing the marginally-held diaphragm 17 against one side of which the piston 18 acts, while the compressed air from the storage tank or its equivalent (not shown) acts against the opposite face of said diaphragm. Fitted into the peripheral portion of the plate or support 2 is a nipple 19 which is adapted to be connected by piping, tubing or otherwise with the air storage tank. Connecting the nipple 19 with the underside of the diaphragm chamber 16 is the passage 20 which may as shown be formed in the plate 2, it being understood that there is a constant and uninterrupted communication between the under or fluid side of the diaphragm chamber 16 and the air storage tank.

The piston 18 is shown furnished with a stem 21 which with certain of its adjuncts hereinafter described, extends through the loop-like or open switch body 4. The plate 10 is shown provided with a removable cap 22 fitting in the tubular extension or boss 23 of the plate 10. Inclosed by said tubular boss 23 is a cross head 24 supported by posts or uprights 25 rising from the short piston cylinder 26, it being understood that said cross head is fixed or stationary. Surrounding the stem 21 is the coiled push spring 27 the lower end of which bears against a projection or collar 28 on the stem 21, while the upper or outer end bears against the projection or flange 29 at the lower end of the screw 30 tapped through the cross head 24, the screw being made hollow and loosely receiving the upper portion of the stem 21. By turning the screw 30 in or out the tension of the spring 27 can be regulated. It will be evident that the said spring 27 operates the diaphragm 17 in opposition to the compressed air or other fluid. The parts are so proportioned in the showing made and as will hereinafter appear, that when the pressure in the storage tank goes below seventy pounds the electric circuit will be closed to start the motor and hence the pump to increase the pressure in the tank and when the pressure is at eighty pounds, the circuit will be broken automatically to stop the motor and pump until the pressure is again reduced by the consumption of air from the storage tank, to seventy pounds. This is merely, however, an illustration; the extreme pressures may be different and the range between the same may also vary.

There is shown supported on the upper side of the plate 2, the lever 31, said lever being pivotally connected between its ends with the stem 21 and being connected by a link at the end opposite its fulcrum with the adjustable crank arm 32 fastened in some suitable manner rigidly to the rock-shaft 33 supported by bearings on the plate 2. To said rock-shaft are shown rigidly fastened the latches 34 and 35, the one 34 on the left in Fig. 1 serving to hold the switch lever 3 in its circuit closing position, while the latch 35 serves to hold said switch lever in its circuit opening position. As the two latches are duplicates a short description of one will apply to the other and in this connection reference will be hereinafter had to Figs. 4 and 5 wherein is illustrated the latch 34. I might add that the switch lever is provided with a suitable catch or projection as 36 engageable alternately by the said latches 34 and 35, which it will be perceived are angularly disposed with respect to each other, or presenting together a form somewhat of V-shape in elevation, although they are separated longitudinally of their common supporting shaft 33. It will be understood that when said shaft is rocked the two latches are simultaneously swung therewith, one of them being moved to its operative or switch-holding position and the other to its switch-lever releasing position.

Figures 2, 4, 5, 6, 7:
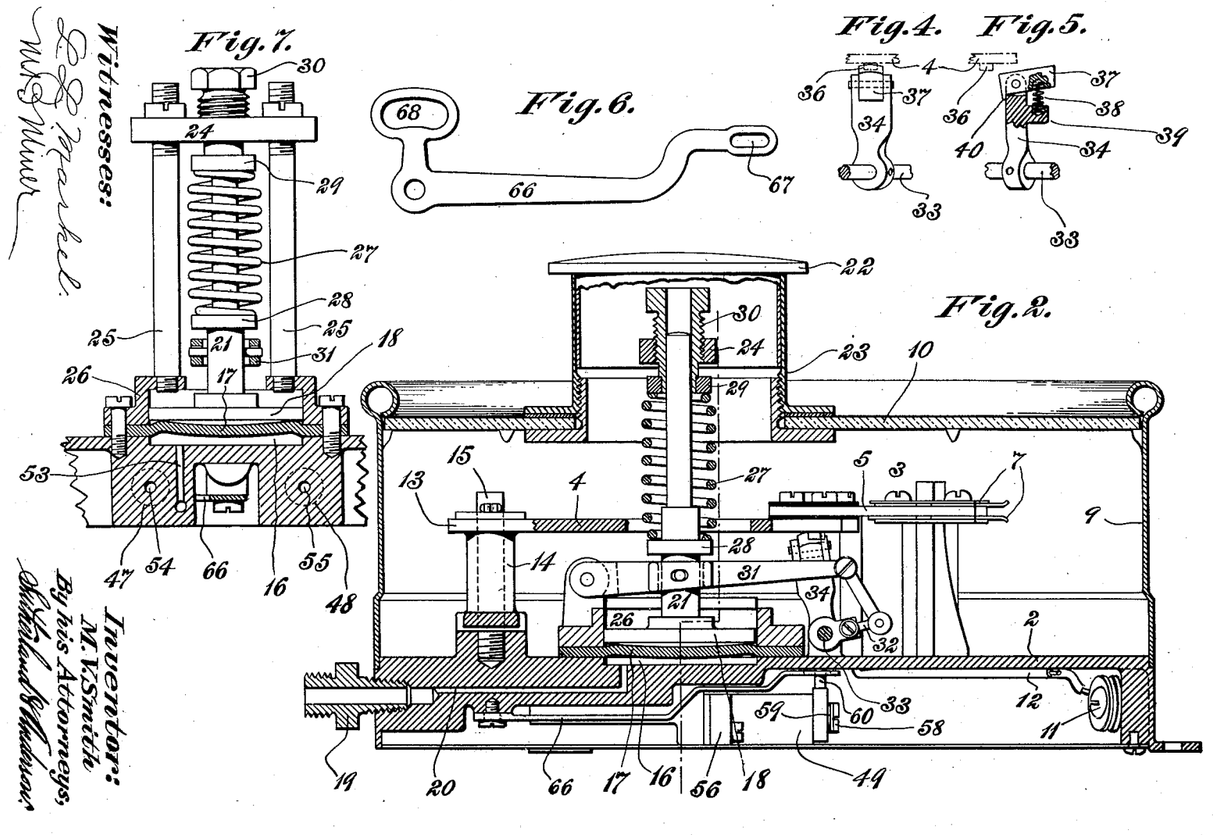
Fig. 2 is a transverse sectional view of said pressure regulator.
Fig. 4 is a detail view of a latch member in elevation.
Fig. 5 is a sectional view of the same.
Fig. 6 is a detail view of a valve operating lever.
Fig. 7 is a sectional view on the line 7—7 of Fig. 2.
Figure 3:
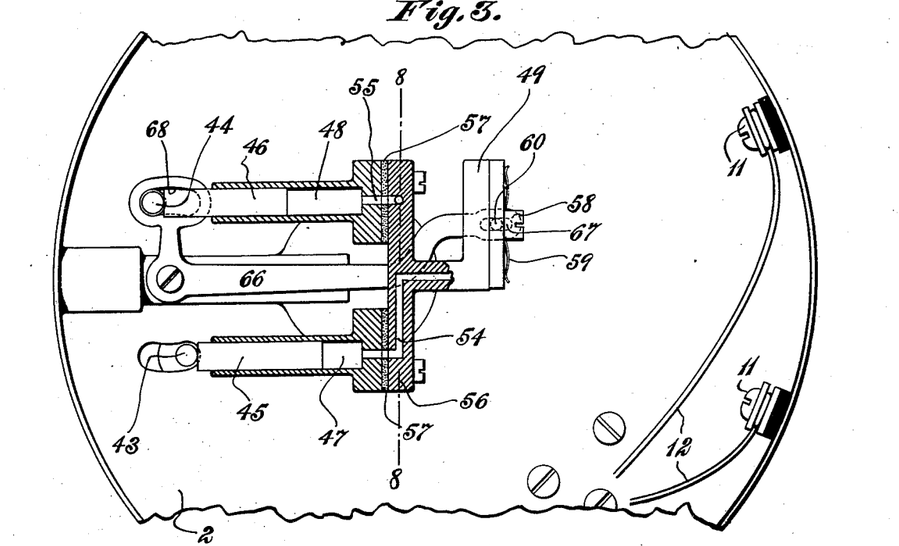
Fig. 3 is a bottom plan view partially in section of the plunger mechanism hereinafter described.
Figure 8:
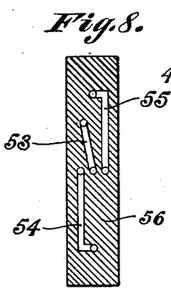
Fig. 8 is a sectional view on the line 8—8 of Fig. 3.
Figures 9, 10, 11, 12:
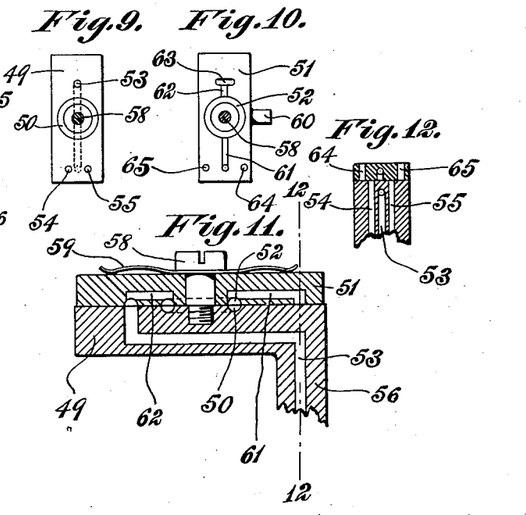
Fig. 9 is a top plan view of stationary valve section.
Fig. 10 is a bottom plan view of pivoted valve section.
Fig. 11 is a sectional view of valve sections assembled and on a slightly larger scale.
Fig. 12 is a sectional view on the line 12—12 of Fig. 11, and, Fig. 13 is a diagrammatical view hereinafter more fully described.

Referring to Figs. 4 and 5, the latch 34 is shown consisting of an arm provided at its free or outer end with a by-pass device or pivoted dog 37 constantly held in operative position by the spring 38 pressing thereagainst and sustained by a lug or offset 39 on said latch 34, the projection 40 on the by-pass or dog at this time bearing against said latch 34. It will be assumed that the switch 3 is being moved from its circuit opening to its circuit-closing position. Just before the switch reaches the latter position, the projection 36 thereon strikes and then swings the by-pass or dog 35 down to thereby freely permit said switch to reach said circuit-closing position at which point the by-pass 37 is thrust quickly upward by the spring 38 to securely hold the switch in its shifted position. On the opposite movement of the switch a similar operation is repeated by the latch 35 whereby the switch will be held in its circuit opening position until the latch 35 is moved to its switch releasing position. It will be apparent that the two latches are automatically shifted and that in the present instance such results are secured in alternation by the compressed air and the spring 27.

Figure 1:
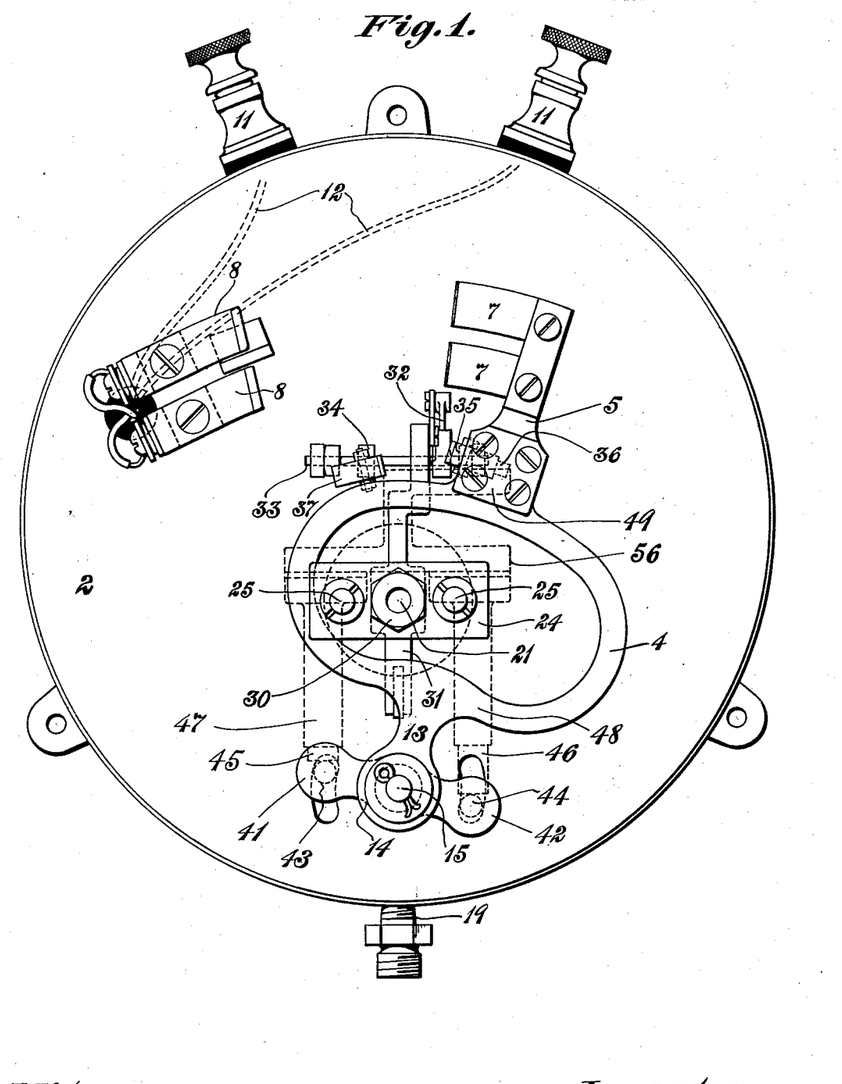
Figure 1 is a top plan view of a pressure regulator involving the invention, with the cover removed and with the switch thereof in circuit-opening position.

It will be assumed that the switch 3 is in the position shown in Fig. 1 (its circuit breaking position) where it is held by the latch 35. At this time the compressor (not shown) is at rest while the latch 34 is out of its effective position being at one side of the arcuate path of the projection 36. Let it be supposed that the pressure in the storage tank drops to sixty-nine pounds. In this event the spring 27 becomes effective for pressing the diaphragm downward owing to the reduced pressure of air and the stem 21 of said plunger is, of course, lowered so that said stem through the described connections will rock the shaft 33 in such manner as to carry the latch 35 free of the projection 36 consequently releasing the switch 3, and the latch 34 into the path of said projection whereby when said switch is shifted from its circuit opening to its circuit closing position, the latch 34 will be in position to hold said switch in said shifted position and until the pressure is restored to about eighty pounds at which time the diaphragm 17 is elevated by the air below the same, the piston 18 and its stem 21 being also lifted whereby through the described connections, the shaft 33 will be rocked to move the latch 34 to its releasing position and the latch 35 to its holding position, in view of which when the switch 3 is thrown from its circuit closing to its circuit opening or breaking position, it will be held in the latter by the latch 35.

The fluid in its action against the switch 3 is controlled by suitable valve mechanism, and the valve mechanism is of such nature as to change the course of the fluid in such manner that when the switch is in one of its positions, it will be shifted to its other position and vice versa. The valve mechanism and coöperating parts may vary greatly, and there may be cases where some of these parts may be dispensed with. Hereinafter I will describe valve mechanism and certain adjunctive devices which meet the conditions I desire.

The hub 14 of the switch lever 13 is shown provided with the lateral and oppositely disposed extensions 41 and 42 furnished at their outer ends with pins or studs denoted by 43 and 44 respectively and engageable by the plungers 45 and 46 slidably fitted in the cylinders 47 and 48 respectively which are generally made integral with the supporting plate 2 and which communicate with the storage tank or its equivalent through valve mechanism hereinafter described and the diaphragm chamber 16.

The valve mechanism to which brief reference has already been made, comprises a bed piece as 49 which has on its upper side an annular channel 50. The bed piece 49 is surmounted by the rocking valve 51 having on its under side an annular channel 52 mating with the annular channel 50. A duct or passage 53 extends from the diaphragm chamber 16 to the outer surface of the bed piece 49. It will, therefore, be apparent that this duct 53 has constant uninterrupted or open communication with the storage tank. I might explain at this time that the upper or outer surface of the bed piece or valve member 49 is flat and that the under or inner surface of the valve 51 is correspondingly formed, the two flat faces having a bearing upon or close engagement against each other. From the cylinder 47 to the upper or outer surface of the valve member or bed piece 49, the duct 54 extends, while a substantially similar duct 55 extends from the cylinder 48 to the upper surface of said bed piece 49. In the present case these ducts 53, 54 and 55 partially extend through the three-part duct member 56 which is shown bolted to the heads of the cylinders 47 and 48 and maintained in air-tight relation therewith by the interposed gasket 57 of rubber or other suitable material. The valve 51 is made in the form of a plate and is pivotally mounted, the pivot 58 being conveniently utilized for this purpose and being shown as a screw tapped into the three-part duct member 56, the valve being held firmly against its seat by a spring 59 bearing against the head of said screw or pivot and also against the valve. Said valve is shown provided with a lateral projection 60 adapted for connection with a lever or its equivalent, as will be hereinafter described, whereby said valve can be shifted to direct the compressed air alternately into the cylinders 47 and 48. Said valve is shown provided on its under side with the channels 61 and 62 extending outwardly from the annular passage 52 radially of the latter, the outer portion of the channel 62 being laterally enlarged or widened as at 63, the said enlargement being in constant communication with the outlet or delivery end of the duct 53. The valve 51 also has ports 64 and 65 through which, as will hereinafter appear, the exhaust can be alternately directed from the cylinders 47 and 48.

An angle or elbow lever is shown at 66 being fulcrumed or pivoted at its angle to a bearing on the plate 2 opposite the side of said plate on which the switch lever 3 is mounted. The long arm of said lever has a loose connection with the stud or projection 60 of the valve 51. For this purpose the said long arm may have an elongated slot 67 to receive said pin or stud. The other and shorter arm of said lever 66 has a lost motion connection with the pin 44, said short arm having an arcuate slot 68 struck from the center of motion of the lever and into which said pin 44 extends. The purpose of this lost motion is to prevent the shifting of the valve to divert or change the course of the air until the time at which the switch lever has practically reached its respective shifted positions.

Figure 13:
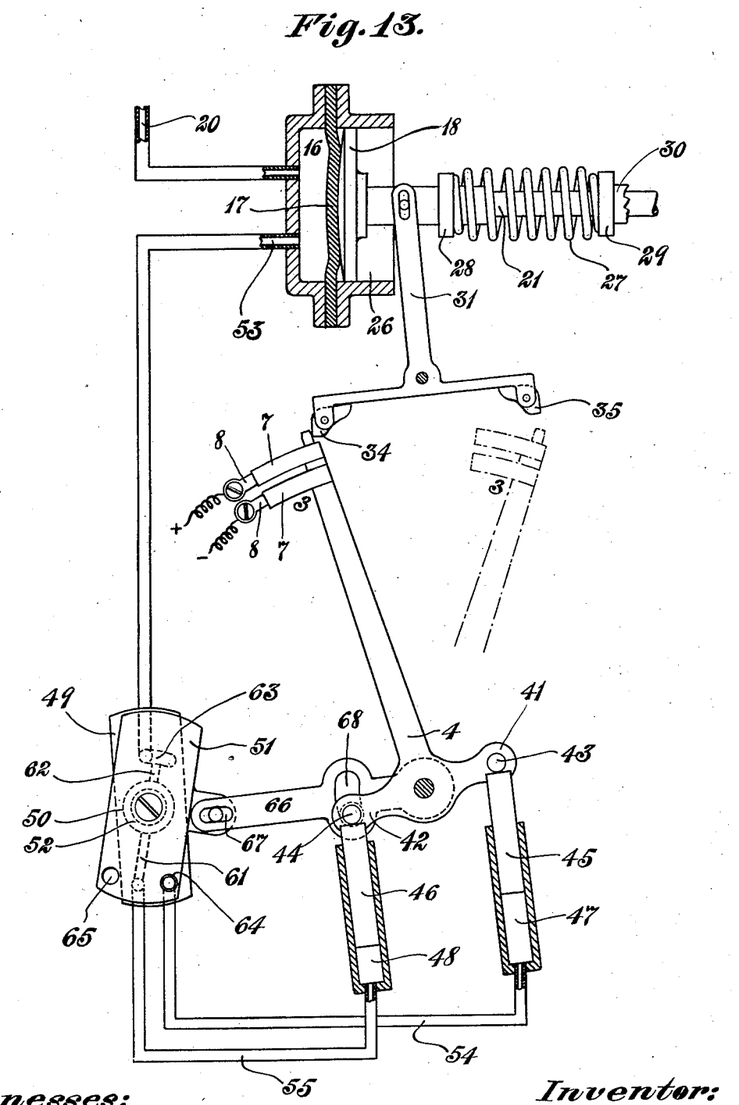

In Fig. 13 I have shown diagrammatically the apparatus and from this particular view, the action will, it is believed, be fully understood, although I deem it desirable to describe this figure somewhat in detail in itself, and I might explain that the switch lever 3 is shown in this particular view as occupying its circuit closing position, it being remembered that said switch lever is illustrated as occupying its circuit opening position in Fig. 1. In this Fig. 13 the latch 34 is in position to hold the switch lever 3 in its circuit closing position. There is no pressure in the cylinder 47, but the cylinder 48 contains a body of compressed air which acts against the plunger 46 and tends to shift said plunger 46 in such way as to throw the lever 4 into its circuit closing position, this particular action, however, being resisted by the latch 34. The air from the storage tank passes into the diaphragm chamber 16 and travels from the duct 53 into the channel or passage 62 and from there into the registering channels 50 and 52 flowing from such registering channels into the passage 61, the discharge end of which is in direct connection with the duct 54. I have, as will be understood, just traced out the course of the air from the storage tank to the cylinder 48. It will be assumed that the pressure goes above the desired standard and when this occurs the pressure of the air elevates the piston 18, whereby the latch 34 will be tripped just at the time the pressure of air reaches the high point. The instant the latch 34 is tripped the compressed air back of the plunger 46 will force the said plunger outward, whereby said plunger operating against the pin 44 will swing the switch 4 instantaneously to its circuit breaking position, and when the shifting movement is completed, the said switch lever will be engaged and held by the latch 35, which in the meantime has been moved to its active position. Just before the switch lever reaches the extreme of its circuit opening shifting movement, the lever 66 will be operated so as to shift the valve 51 and therefore direct the air into the duct 54 so that the air will tend to advance the plunger 45. This latter action, as will be understood, will be resisted by the latch 35 until the pressure is reduced at which time the piston 18 will be lowered by the spring 27 to effect, as already described, the tripping of the latch 35, and when this takes place the lever 3 will be instantly shifted to its circuit closing position, and when it reaches such position it will be there held by the latch 34, and just before this point is reached, the valve 51 will be again shifted to direct the compressed air into the duct 55. The lost motion connection between the lever 66 and the pin 44 prevents the shifting of the valve until the lever 3 has practically reached the limits of its movements. As will be understood, the ports 64 and 65 provide for the exhaust of the air from the ducts 54 and 55 at the proper points. The lateral enlargement 63 of the channel or passage 62 provides for the balancing of the valve 51, in that by this feature, there is always a supply of compressed air against the valve 51 which acts on said valve on the pressure side in opposition to that air on the exhaust side. The latches 34 and 35 or their equivalents in addition to effectually holding the lever 3 in its extreme positions under ordinary circumstances are particularly advantageous in connections where the apparatus is subjected to considerable jar or shock such as would be the case on a street car. Owing to the presence of these latches, it is impossible to shake the lever 3 loose from either of its shifted positions.

As already intimated my apparatus involves what I have broadly termed a "controller" by which the action of a motor or engine can be governed and in the form of apparatus illustrated in the drawings, this controller is made as a switch having at least two positions in one of which it is adapted for instance to start a motor, while in another it is adapted to arrest or limit but not necessarily stop the motor or equivalent part, although as shown when the controller is in one of said positions, it is actually intended to stop the motor, but it should be understood that I do not restrict myself in these respects. Undoubtedly the action of the apparatus will be fully understood from the description already given; however, there is one point that I might elaborate upon somewhat at this time. The switch arm 4 is acted upon at all times by the fluid of whatever character the same may be and which tends constantly to shift said switch. While it is not essential that the switch be oscillatory it is shown as adapted for this particular motion, and the construction is such that the switch is automatically oscillated; that is to say the switch will be swung from the full line position in Fig. 13 to the dotted line position by the power of the fluid and will afterward be moved from the dotted line position to the full-line position also by the power of the fluid. I might mention that the diaphragm 17 and its coöperating devices, present in effect a timing device by which the release of the switch or analogous part can be effected at exact points, and in this way great nicety and preciseness in results are assured. By the use of the diaphragm or something equivalent to it as contemplated by me, I can insure control of the switch within very low limits, and also prevent the same being accidentally moved from the several positions by shocks and the like.

What I claim is:

1. In an apparatus of the class described, the combination of a motor controlling device, fluid conveying means, means operable automatically and solely by the fluid for shifting said motor controlling device into a plurality of motor controlling positions, means for holding the said device in its respective positions, and means for automatically releasing the motor controlling device when the pressure of the fluid reaches predetermined yet different points.

2. In an apparatus of the class described, the combination of an oscillatory motor-controlling device, fluid conveying means, means operable by the fluid for automatically shifting said device into a plurality of motor-controlling positions, means for positively holding the device in its respective positions, and means governed independently by the fluid for releasing the said device at successive times and when the pressure of the fluid reaches predetermined yet different points.

3. In an apparatus of the class described, the combination of a motor-controlling device, fluid conveying means, means involving a valve, for automatically changing the course of the fluid to effect alternately successive movements of said controller into a plurality of distinct positions, means for positively holding the controller in its shifted positions, and means governed by the fluid for releasing the controlling device when the pressure reaches predetermined yet different points.

4. In an apparatus of the class described, the combination of a motor controlling device, fluid conveying means, means including a valve, for automatically causing the fluid to act against the controlling device to shift the same into a plurality of distinct positions, means actuated by said controlling device for operating said valve to change the course of the fluid, means for holding the controlling device in its respective positions, and means for releasing the controlling device when the pressure reaches predetermined yet different points.

5. In an apparatus of the class described, the combination of a controller, means for automatically oscillating said controller, a shaft, a pair of latches rigidly supported by said shaft and serving alternately to hold the controller in its shifted positions, and fluid governed means for rocking said shaft to thereby move one latch to its operative position and simultaneously the other latch to its inoperative position.

6. In an apparatus of the class described, the combination of a motor starting and stopping device, a pair of pneumatic elements each of which has a movable member active against said motor starting and stopping device, means for directing fluid alternately against the movable members in a direction to shift said controller, means for holding the said device positively in its motor stopping and motor starting positions, and fluid operable means for effecting the release of said motor starting and stopping device at predetermined points.

7. In an apparatus of the class described, the combination of a motor starting and stopping device, a diaphragm chamber provided with a diaphragm, means for admitting a fluid into the diaphragm chamber to operate the diaphragm in one direction, a yieldingly operable piston for operating the diaphragm in opposition to said fluid, means for directing the fluid from said diaphragm chamber against said motor starting and stopping device to effect successive movements of the same on variations in pressure of the fluid, means for positively holding said motor starting and stopping device in different positions, and means operable by said piston for effecting the release of said motor starting and stopping device.

8. In an apparatus of the class described, the combination of a motor starting and stopping device, a diaphragm chamber, means for delivering a fluid into said diaphragm chamber to operate the diaphragm in one direction, a spring operated plunger for operating the diaphragm in opposition to said fluid, means including a valve for directing the fluid against the said motor starting and stopping device to alternately shift the same in opposite directions directly by the fluid, a pair of latches for positively holding said motor starting and stopping device in its said shifted positions, and means operable by said piston for moving one latch into a releasing position and simultaneously moving the other latch toward its operative position.

9. In an apparatus of the class described, the combination of a diaphragm chamber provided with a diaphragm, means for admitting a fluid to said diaphragm chamber to operate the diaphragm, a spring operated piston for operating the diaphragm in opposition to the fluid, a duct leading from said diaphragm chamber, a pair of ducts, a valve for directing the fluid alternately into said pair of ducts, a pair of cylinders in communication with the respective pairs of ducts, plungers in said cylinders, a motor starting and stopping device operable by said plungers whereby the plungers can shift the said device in opposite directions alternately, latches for holding said device in its two shifted positions, and means operable by said piston for moving one latch to an inoperative position and for simultaneously moving the other latch to its operative position.

10. In an apparatus of the class described, the combination of a motor starting and stopping device, means including a valve, for directing fluid alternately against the said device to shift the same in opposite directions, a lost motion connected between said device and valve for operating the latter, latches for holding said device in its two shifted positions, and means operable by the fluid for tripping one latch and for simultaneously moving the other latch to its operative position.

11. In an apparatus of the class described, the combination of a motor starting and stopping device, a pair of fluid operable members associated with said device, fluid conveying means including valve mechanism, adapted at all times to cause the action of the fluid against one or the other of said members to thereby constantly tend to shift said device, and means for automatically operating the valve mechanism to cause the fluid to shift said members in alternation when the pressure of the fluid reaches predetermined yet different points.

12. In an apparatus of the class described, the combination of a motor starting and stopping device, a pair of fluid operable members associated with said device, fluid conveying means including valve mechanism, adapted at all times to cause the action of the fluid against one or the other of said members to thereby constantly tend to shift said members, means for positively holding the said device in its motor starting and stopping positions, fluid governed means for automatically effecting the release of said device when in its respective positions and when the pressure of the fluid reaches predetermined yet different points, whereby when said device is released it can be shifted by the fluid, and means for operating the valve mechanism on the movement of said device to thereby change the course of the fluid.

13. In an apparatus of the class described, the combination of a motor starting and stopping device, fluid conveying mechanism having means for directing fluid against the said device and constantly tending to automatically and directly shift the same either to its motor starting or motor stopping positions, means for positively holding said device in its two positions, and means for automatically effecting the release of said device when the pressure of the fluid reaches predetermined yet different points.

14. In an apparatus of the class described, the combination of a motor starting and stopping device, fluid conveying mechanism having means for positively causing the fluid to constantly and directly act against said device in a direction to shift the same to its motor starting or motor stopping positions, latches for positively holding the said device in its said positions, and means governed by the fluid for tripping said latches when the pressure of the fluid reaches predetermined yet different points.

15. In an apparatus of the class described, the combination of a motor starting and stopping device, fluid conveying mechanism having means for directing at all times fluid against the said device in a direction to move the same into its starting or stopping positions, a pair of latches, means connecting said latches for simultaneous movement, and mechanism governed by the fluid for moving one latch to an active position, and the other latch to an inactive position when the pressure passes below a certain point and for reversing such operation when the pressure passes above a certain point.

16. In an apparatus of the class described, the combination of an oscillatory motor starting and stopping device, means for positively holding the motor starting and stopping device in its respective shifted positions, fluid governed means for alternately releasing the said motor starting and stopping device when the pressure of the fluid reaches predetermined yet different points, means for directing at all times fluid against said device and tending thereby to constantly move the same directly by the fluid to its starting or stopping positions and including a valve, and means operative by said motor starting and stopping device for operating the valve to change the course of the fluid when said device practically reaches the limits of its respective movements.

17. The combination of a motor controlling device having several distinct motor controlling positions, fluid conveying means, means for holding said motor controlling device in its respective positions, means for automatically releasing the said motor controlling device when the pressure of the fluid reaches predetermined yet different pressures, and means for causing the fluid to act against the said motor controlling device when the same is released to shift the same by the power of the fluid to one of its said positions and for directing the fluid against said motor controlling device to shift the same in the other of said positions when said device is subsequently released.

18. In an apparatus of the class described, the combination of a motor controlling device having several distinct motor controlling positions, means for holding said device in its several positions, automatic means for effecting the release of said device at successive points, and fluid operable means for shifting said device when released at one point, into one of said motor controlling positions and for shifting said device into another of said motor controlling positions when said device is subsequently released.

19. In an apparatus of the class described, the combination of a motor controlling device having several distinct motor controlling positions, means for holding said device in its several positions, automatic fluid governed means for effecting successively the release of said device when the pressure of the fluid passes above and below certain points, means for causing the effect of the fluid constantly against said device whereby the fluid tends at all times to shift said device, a valve for controlling the course of the fluid, and automatically operable means for actuating the valve to change the course of the fluid practically at the time said device reaches its respective positions.

In testimony whereof I affix my signature in presence of two witnesses.

MARTIN V. SMITH.

Witnesses:
F. E. ANDERSON,
HEATH SUTHERLAND.

Copies of this patent may be obtained for five cents each, by addressing the "Commissioner of Patents, Washington, D. C."